Dec. 25, 1928.
W. LATTA
1,696,852
PEAVEY
Filed April 27, 1923
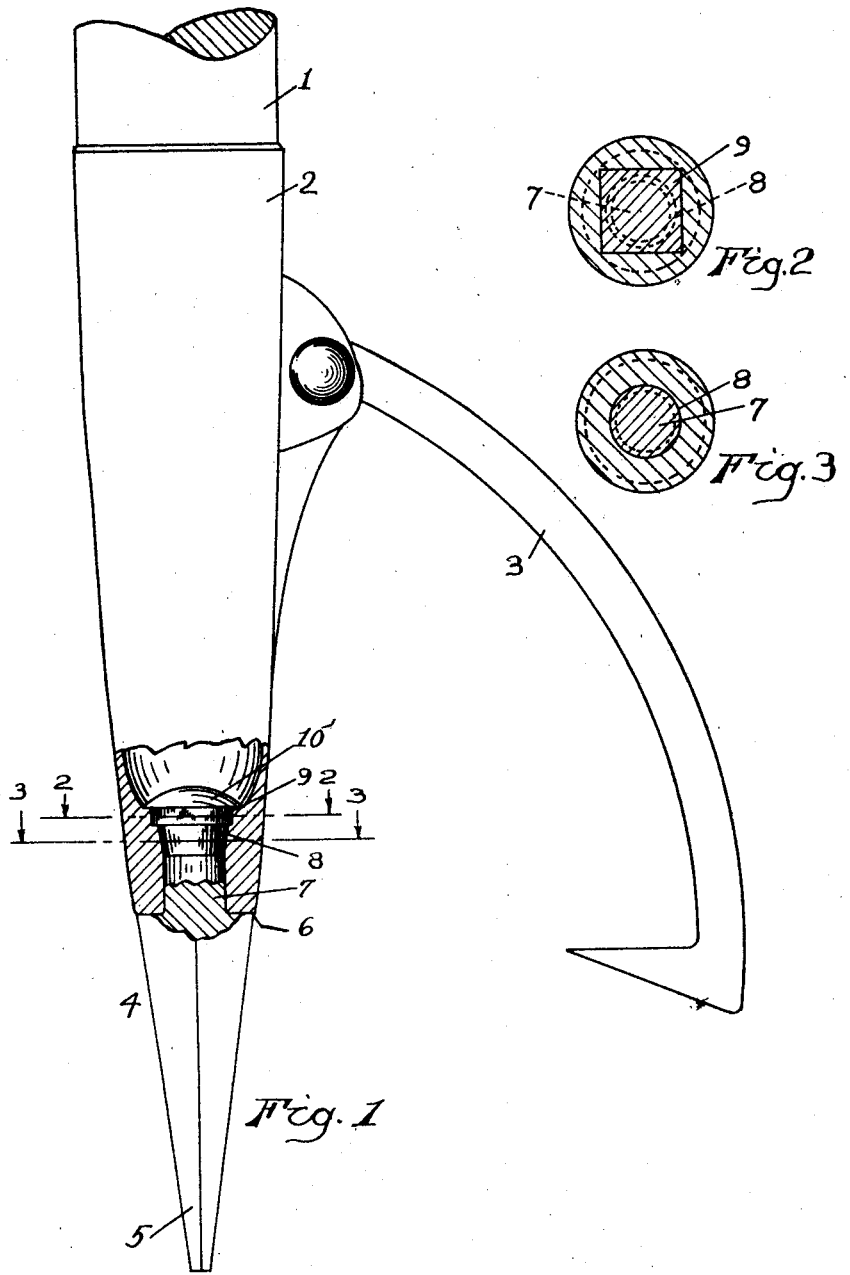
INVENTOR
WILLIAM LATTA.
BY
Geo. B. Willcox
ATTORNEY Patented Dec. 25, 1928.

1,696,852

UNITED STATES PATENT OFFICE.

WILLIAM LATTA, OF EVART, MICHIGAN, ASSIGNOR TO AMERICAN LOGGING TOOL CO., A CORPORATION OF MICHIGAN.

PEAVEY.

Application filed April 27, 1923. Serial No. 635,031.

This invention relates to peavies and pertains particularly to an improved construction of the spike and socket whereby the objects of my invention are attained. These objects are to produce a two-piece socket and spike secured together in such a manner that when assembled they form a structure rigid, stronger and more durable than the one-piece wrought steel device heretofore used.

A further object is to provide a construction that will enable the use of a malleable iron socket with a spike or pike made of wrought steel or other material. The malleable socket being admirably adapted for this purpose will stand a much greater strain without bending than the forged steel socket. The weak point in a wrought socket as usually constructed is at the point where it is joined to the carbon steel pick.

My improvement does away with bending and weakness at this point. Further, the malleable socket being much harder, the jaws of the socket do not wear out nearly so fast as wrought or forged sockets.

In the drawings, Fig. 1 is a part sectional side view of a peavey embodying my improvement.

Fig. 2 is a cross section on line 2—2 of Fig. 1.

Fig. 3 is a cross section on line 3—3 of Fig. 1.

As is clearly shown in the drawings, the peavey consists in the usual handle 1, socket 2 and a hook 3 pivotally secured to the side of the socket.

The socket 2 as above mentioned is preferably made of malleable iron or equivalent material and at its lower end carries a pike 4 of steel or other suitable material having a sharpened point 5.

An important feature of my improved construction resides in the means for connecting the pike 4 with the socket 2 and making this connection so rigid that the assembled pike and socket will be stronger than if made of one-piece of wrought steel. Furthermore the construction of the connection between the pike and the socket is such that the pike can be readily removed from the socket by drilling in case the point 5 becomes damaged, requiring replacement of the pike.

The socket 2 is a tubular member of malleable iron or other suitable material, the upper part receiving the end of the handle 1, and the reduced lower end formed with a bore cylindrical at its lower end, rectangular in cross section at its inner end, and conical or tapered in that part between the two ends. Into this cylindrical tapered and rectangular recess or bore is received the heated shank of pike 4, the inner end of the shank being then riveted to thereby upset the metal of the shank so as to fill the tapered and rectangular parts of the recess and form a rivet head within the socket as shown in Fig. 1.

The pike is formed with a shoulder 6 which seats against the lower end of the socket 2 and has an upwardly projecting spindle 7 preferably round and somewhat longer than the bore of the socket. When riveted as above described the spindle 7 becomes shaped to form a tapered cylindrical or conical part 8, above which is a square or polygonal part 9 forming a square head, the upper part of which forms a rivet head as at 10.

The part 9 prevents the pike from turning and the riveted head 10 and shoulder 6 tightly anchor the pike to the end of the socket 2.

The riveting may be accomplished in the usual manner by a riveting tool inserted into the opposite end of the socket 2.

When the pike 4 is to be removed the riveted end 10, the square flange 9 and the conical part 8 are cut out by a drill inserted from the opposite end of the socket, after which the pike 4 can be taken out and a new pike inserted.

By the means above described I have produced a simple and relatively inexpensive two-piece pike and socket, the socket having the strength and toughness of malleable iron or equivalent material and the pike and point of hard tough steel or similar material, the pike being removable without the necessity of discarding the socket.

Having thus described my invention, what I claim and desire to secure by Letters Patent is:

Means for securing a pike in the end of a peavey socket having a reduced end portion comprising a cylindrical shank on the pike, the terminal part of the reduced end portion of the socket formed with an axial cylindrical bore permitting insertion of and providing a bearing for said shank, an intermediate part of said end portion formed with a tapered bore to provide an anchorage for said shank against endwise movement, the upper part of said end portion formed with an internal rectangular socket to provide an anchorage for said shank against turning, the end of said shank upset to fill said tapered part and said rectangular socket respectively.

In testimony whereof, I affix my signature.

WILLIAM LATTA.